United States Patent [19]

Reuter

[11] Patent Number: 4,846,423

[45] Date of Patent: Jul. 11, 1989

[54] GLIDING WING PARACHUTE APPARATUS WITH STAGED REEFING DEPLOYMENT MEANS

[75] Inventor: James D. Reuter, Manchester, Conn.

[73] Assignee: Pioneer Aerospace Corporation, South Windsor, Conn.

[21] Appl. No.: 123,733

[22] Filed: Nov. 23, 1987

[51] Int. Cl.⁴ ..................... B64D 17/02; B64D 17/36
[52] U.S. Cl. ..................................... 244/145; 244/152
[58] Field of Search ........................ 244/142, 145, 152

[56] References Cited

U.S. PATENT DOCUMENTS

| | | |
|---|---|---|
| 2,929,589 | 3/1960 | Carter et al. . |
| 3,245,639 | 4/1966 | Mitchell . |
| 3,756,547 | 9/1973 | Snyder et al. . |
| 3,822,844 | 7/1974 | Sutton . |
| 3,945,592 | 3/1976 | Sutton . |
| 4,065,079 | 12/1977 | Winchurch . |
| 4,129,272 | 12/1978 | Jones et al. . |
| 4,175,722 | 11/1979 | Higgins . |
| 4,540,145 | 9/1985 | Matsua . |

Primary Examiner—Galen Barefoot
Attorney, Agent, or Firm—Sperry, Zoda & Kane

[57] ABSTRACT

A gliding wing parachute apparatus having a plurality of longitudinally extending ram-air inflation cells which are grouped into individual stages which are released preferably upon full inflation of the previous stage. The stages are preferably balanced with respect to the centerline of the parachute. The second and third stages are reefed by being retained by lacing or fabric flaps into closed position until full deployment of the previously deployed stage is completed. Pyrotechnic cutting devices can be responsive to full inflation to cause release of the next scheduled stage of ram-air inflation cells. Subsequent stages can be formed by inflation cells of a thinner material since the load will be less than during initial deployment. Also tensile strength of suspension lines can be decreased with subsequent stages due to lower loading characteristics.

15 Claims, 3 Drawing Sheets

GLIDING WING PARACHUTE APPARATUS WITH STAGED REEFING DEPLOYMENT MEANS

BACKGROUND OF THE INVENTION

1. Field Of The Invention

The present invention pertains to the field of parachute devices and most specifically to the field of gliding wing parachute configurations utilizing a plurality of longitudinally extending ram-air inflation cells to facilitate accurate control of movement of the gliding wing parachute. The present invention is particularly usable with deployment and inflation of large parachutes with a great number of ram-air inflation cells which can be used for carrying loads as heavy as 5,000 to 75,000 lbs. Such gliding wing devices can include as many as 27 individual inflation cells or more.

2. Description of the Prior Art

Examples of prior art controls for reefing of various types of parachutes are as shown in U.S. Pat. No. 2,929,589 patented Mar. 22, 1960 to W. M. Carter et al on a Parachute Disreefing Apparatus; U.S. Pat. No. 3,245,639, patented Apr. 12, 1966 to J. R. Mitchell on a Reefing Means For Parachutes; U.S. Pat. No. 3,756,547, patented Sept. 4, 1973 to S. L. Snyder et al on a Manually Released Refining Control; U.S. Pat. No. 3,822,844, patented July 9, 1974 to S. J. Sutton on a Parachute; U.S. Pat. No. 3,945,592, patented Mar. 23, 1976 to S. J. Sutton on an Air Reefing System; U.S. Pat. No. 4,065,079, patented Dec. 27, 1977 to C. J. Winchurch on a Parachute Reefing Device; U.S. Pat. No. 4,129,272, patented Dec. 12, 1978 to A. W. Jones et al on an Aerofoil Structure; U.S. Pat. No. 4,175,722, patented Nov. 27, 1979 to M. W. Higgins on a Control System For Ram Air Gliding Parachute; and U.S. Pat. No. 4,540,145, patented Sept. 10, 1985 to J. T. Matsuo on a Reefing System.

SUMMARY OF THE INVENTION

The present invention provides a gliding wing parachute apparatus including a plurality of longitudinally extending ram-air inflation cells which are laterally secured with respect to one another. These inflation cells each define a front air inlet opening to facilitate flow of air therein for deploying the individual inflation cells.

The gliding wing parachute apparatus will include a plurality of suspension lines extending from the inflation cells downwardly to a common load carrying position therebelow. The ram-air inflation cells are divided into individual stages wherein one stage is completely released prior to release of the next stage.

A first stage defining a plurality of ram-air inflation cells are maintained in an open position to allow initial inflating of the gliding wing parachute. The inflation cells comprising the first stage means will preferably be laterally balanced to maintain stability of the gliding wing parachute prior to deployment of the second stage. The second stage comprises a plurality of ram-air inflation cells with the front air inlet openings being retained closed to prevent inflation thereof during deployment of the first stage. A second stage reefing retainment means is adapted to retain these front air inlet openings in the second stage closed. A second stage reefing deployment means is operatively attached with respect to the second stage reefing retainment means for selective releasing thereof for fuller deployment of the gliding wing parachute.

The second stage reefing deployment means is operative to release the second stage reefing retainment means responsive to full inflation of the first stage means. A supplementary second stage reefing retainment means can be included which is adapted to retain the ram-air inflation cells of the second stage in a collapsed position only responsive to the second stage reefing retainment means retaining the front air inlet openings of the second stage closed. Thus when the second stage reefing retainment means is released the supplementary second stage reefing retainment means will also be simultaneously released. The ram-air inflation cells defined in the second stage are also preferably symmetrically balanced about the center line of the gliding wing parachute to facilitate balance of the parachute apparatus prior to deployment of the third stage. The greatest forces will be placed upon the suspension lines of the first stage since the heaviest loads will be created during initial deployment of the first stage. As such the material of the inflation cells of the first stage and the first stage suspension lines will be of the strongest material. The material of the inflation cells of the second and third stage and the suspension lines secured thereto can be of less strength material since the heavy initial shock forces will not be incurred by those materials since they are not associated with initial deployment.

The second stage reefing retainment means can include a second stage lateral lacing which selectively retains the front air inlet openings of the second stage closed. Also the second stage ram-air inflation cells can be retained closed by a second stage lateral flap which itself is secured in position by the second stage lateral lacing means. A pyrotechnic cutting means can be included within the second stage deployment means to facilitate release of the lateral lacing means and subsequent release of the second lateral flap means.

A third stage may be defined by a plurality of ram-air inflation cells positioned in balanced lateral configuration with respect to the center line of the parachute. This third stage is held closed by a third stage reefing retainment means of similar configuration to that of the second stage reefing retainment means. A third stage reefing deployment means is attached with respect to the second stage reefing retainment means for selective releasing thereof for fuller deployment of the gliding wing parachute. The second stage reefing deployment means is operative to release the third stage reefing retainment means responsive to full inflation of both the first stage and the second stage. A supplementary third stage reefing retainment means may be included to retain the ram-air inflation cells of the third stage in a collapsed position at all times when the third stage reefing retainment means retains the front air inlet openings thereof closed. Release of the third stage reefing deployment means will result in simultaneous release of the supplementary third stage reefing retainment means. The supplementary third stage reefing retainment means basically secures the material of the cells with respect to one another whereas the third stage reefing retainment means closes the front air inlet openings of the third stage. Simultaneous releasing of these two retaining means is preferable.

The third stage reefing retainment means can include a third stage lateral lacing means and also optionally a third stage lateral flap means to facilitate retainment of the front air inlet openings of the third stage closed.

Also a third stage pyrotechnic cutting means can be included to facilitate release of the third stage lateral lacing means.

It is an object of the present invention to provide a gliding wing parachute apparatus with stage reefing deployment means wherein usage with heavy payloads of from 5,000 to 75,000 lbs. is made possible.

It is an object of the present invention to provide a gliding wing parachute apparatus with stage reefing deployment means wherein staged deployment and inflation of large parachutes can be performed more safely and reliably.

It is an object of the present invention to provide a gliding wing parachute apparatus with stage reefing deployment means wherein more accurate control of the inflation of cell-type gliding wing parachutes is made possible.

It is an object of the present invention to provide a gliding wing parachute apparatus with stage reefing deployment means wherein cost of materials is minimized.

It is an object of the present invention to provide a gliding wing parachute apparatus with stage reefing deployment means wherein maintenance costs are minimized.

It is an object of the present invention to provide a gliding wing parachute apparatus with stage reefing deployment means wherein parachutes using 27 cells and greater can be carefully and controllably deployed.

It is an object of the present invention to provide a gliding wing parachute apparatus with stage reefing deployment means wherein symmetry is maintained by distributing the reef cells equally in the left and right portions of the canopy.

It is an object of the present invention to provide a gliding wing parachute apparatus with stage reefing deployment means wherein suspension lines can be utilized having less tensile strength if in those lines remaining inert during initial deployment.

It is an object of the present invention to provide a gliding wing parachute apparatus with stage reefing deployment means wherein the fabric used for defining the ram-air inflation cells of second and subsequent stages can be of less fabric strength since they are not involved in the heavy shock loads incurred during initial deployment.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

The present invention provides a plurality of ram-air inflation cells 10 formed into a gliding wing parachute apparatus having staged reefing deployment means. Each ram-air inflation cell 10 includes a front air inlet opening 12 adapted to receive air therein to inflate the ram-air cells to facilitate load carrying thereby. A plurality of suspension lines 16 extend downwardly from each of the inflation cells to a common load carrying position 18 therebelow. The apparatus of the present invention is particularly usable for carrying loads in the heavier range normally used with such parachute apparatus as disclosed herein. These loads are often as much as 75,000 lbs.

Figure 1:
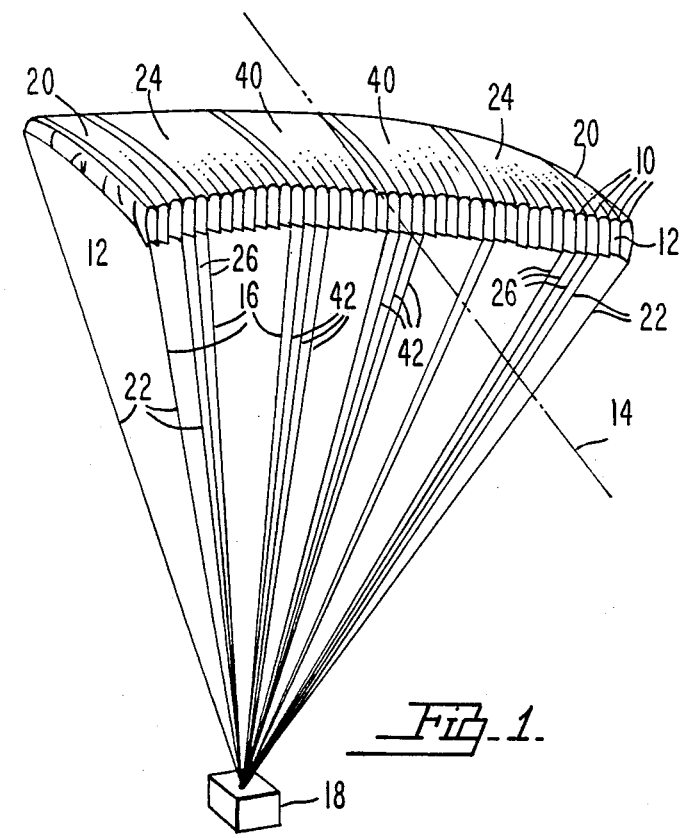
FIG. 1 is a front perspective view of an embodiment of the gliding wing parachute apparatus with staged reefing deployment means of the present invention.
Figure 3:
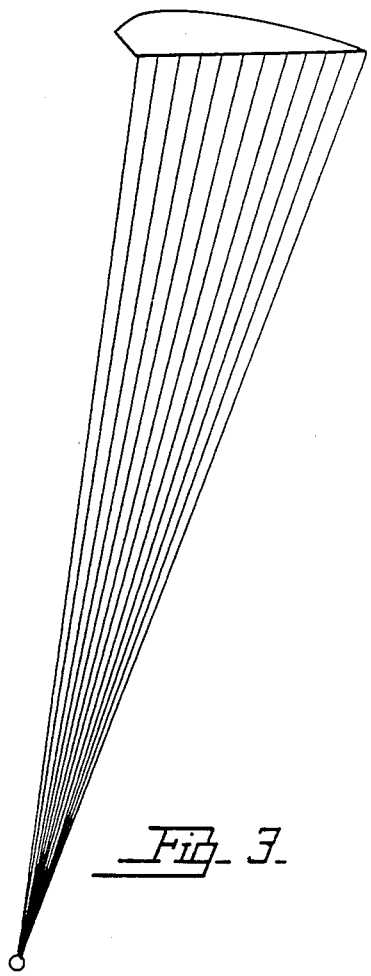
FIG. 3 is a side plan view of an embodiment of a ram-air inflation cell of the present invention.
Figure 4:
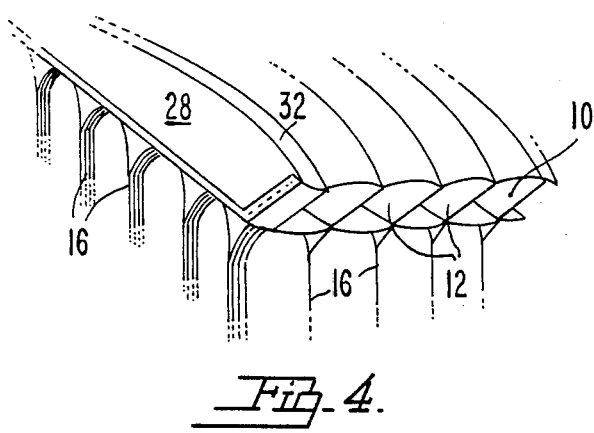
FIG. 4 is a perspective view of an embodiment of the gliding wing parachute apparatus of the present invention showing a deployed section adjacent to a reefed section.
Figure 5:
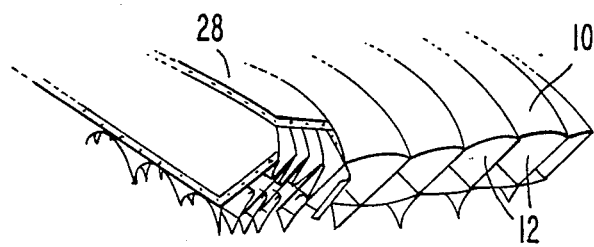
FIG. 5 is a view of the apparatus shown in FIG. 4 in a partially disreefed position.
Figure 2:
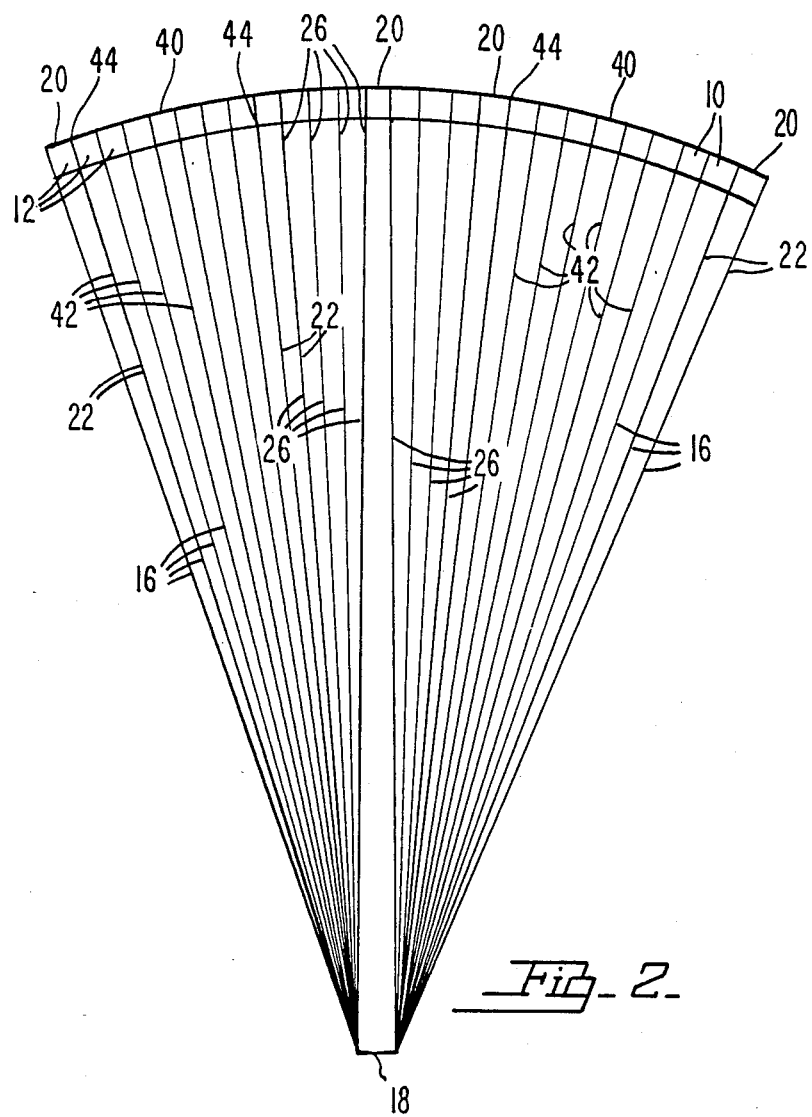
FIG. 2 is a front plan view of another embodiment of a gliding wing parachute apparatus with staged reefing deployment means of the present invention.
Figure 6:
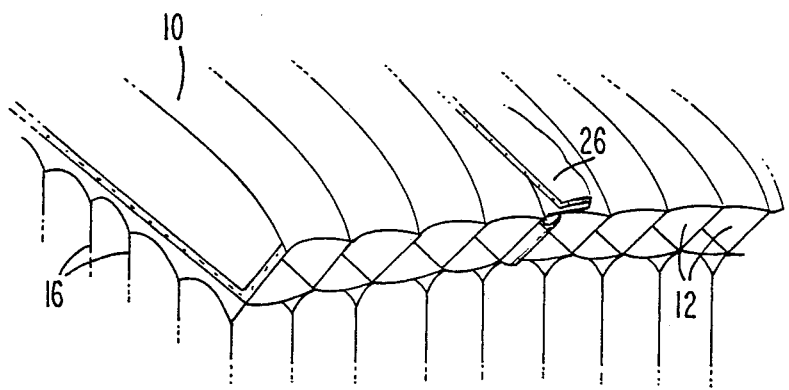
FIG. 6 is a view as shown in FIG. 4 shown in the fully deployed position.
Figure 7:
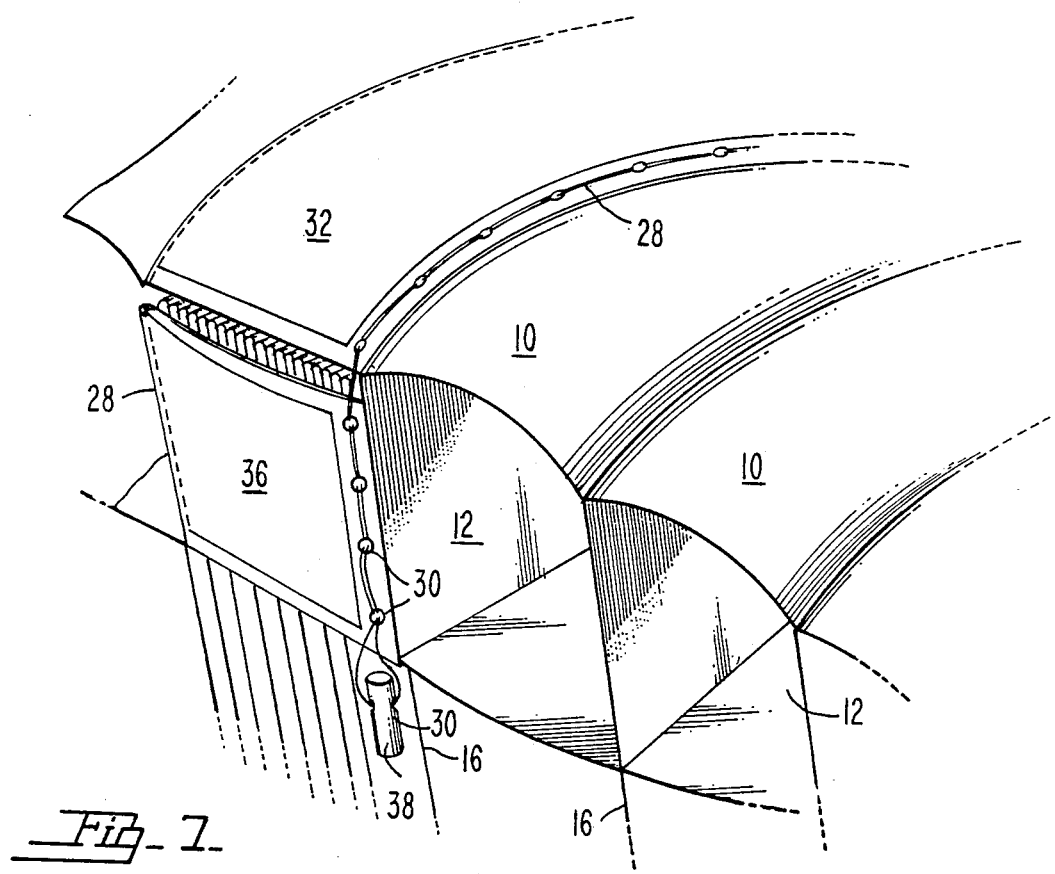
FIG. 7 is a view showing an embodiment of the second stage means in the retained position.

The ram-air inflation cells 10 will be divided into a plurality of sections or stages. A first stage means 20 will have the front air inlet openings 12 of the ram-air inflation cells 10 defined therein maintained always in an open position. As such during initial deployment first stage means 20 will immediately deploy causing the gliding wing parachute to achieve the general overall shape shown in FIGS. 1 and 2. To maintain stability of the gliding wing parachute apparatus when only the first stage 20 is deployed it is preferable that the ram-air inflation cells 10 forming the first stage 20 be symmetrically positioned about the center line 14 of the parachute.

A plurality of first stage suspension lines 22 will extend upwardly from the load to the first stage means 20 in the canopy of ram-air inflation cells 10 defined thereabove.

A second stage means 24 may also define a plurality of ram-air inflation cells 10 also being preferably oriented symmetrically about center line 14 of the parachute apparatus. The second stage means 24 will have the front air inlet openings 12 thereof maintained in a closed position by second stage reefing retainment means 28. Once the first stage means 20 is completely deployed the second stage reefing deployment means 30 will be actuated causing release of the second stage reefing retainment means 28 to initiate deployment of second stage 24.

To facilitate retainment of the second stage means 24 in the reefed position prior to the time for deployment thereof a supplementary second stage reefing retainment means 32 may be included which is adapted to secure the individual inflation cells 10 of the second stage 24 with respect to one another. This supplementary second stage reefing retainment means 32 will thereby supplement the second stage reefing retainment means 28 which itself is adapted to close the front air inlet openings 12 of the ram-air inflation cells 10 defined within the second stage 24. Preferably the supplementary second stage reefing retainment means 32 will be released simultaneously with release of the second stage reefing retainment means 28. This time of release will most preferably be at the time of full deployment of the first stage means 20.

The front air inlet openings 12 of the inflation cells 10 of second stage means 24 will preferably be retained in the closed position by a second stage lateral lacing means 34. Lacing means 34 can be supplemented by a second stage lateral flap means 36 which is normally dependent upon the number of cells defined within the particular section of the second stage means 24. To facilitate release of the lateral lacing means 34 a second stage pyrotechnic cutting means 38 may be positioned thereagainst to sever the lacing and allow for full deployment of the second stage means 24.

A plurality of second stage suspension lines 26 will extend from the second stage means 24 to the common load carrying position 18 therebelow. These suspension lines will be inert prior to deployment of the second stage means 24 and as such can be formed of a material having less tensile strength than the first stage suspension lines 22. The highest loading forces will occur during initial deployment of the first stage means 20 and therefore the second stage suspension lines 26 being inactive during that initial deployment will not of necessity be of such high strength material as the first stage suspension lines 22. Similarly the material forming the ram-air inflation cells 10 of the second stage means 24 will also not be required to have a fabric strength as strong as those ram-air inflation cells 10 which define the first stage means 20.

A third stage means 40 may be included in the present invention being configured somewhat similar to the second stage means 24. Third stage means 40 is defined by a plurality of ram-air inflation cells 10 preferably chosen in a laterally balanced symmetrical configuration about the center line 14 of the gliding wing parachute apparatus.

Figure 8:
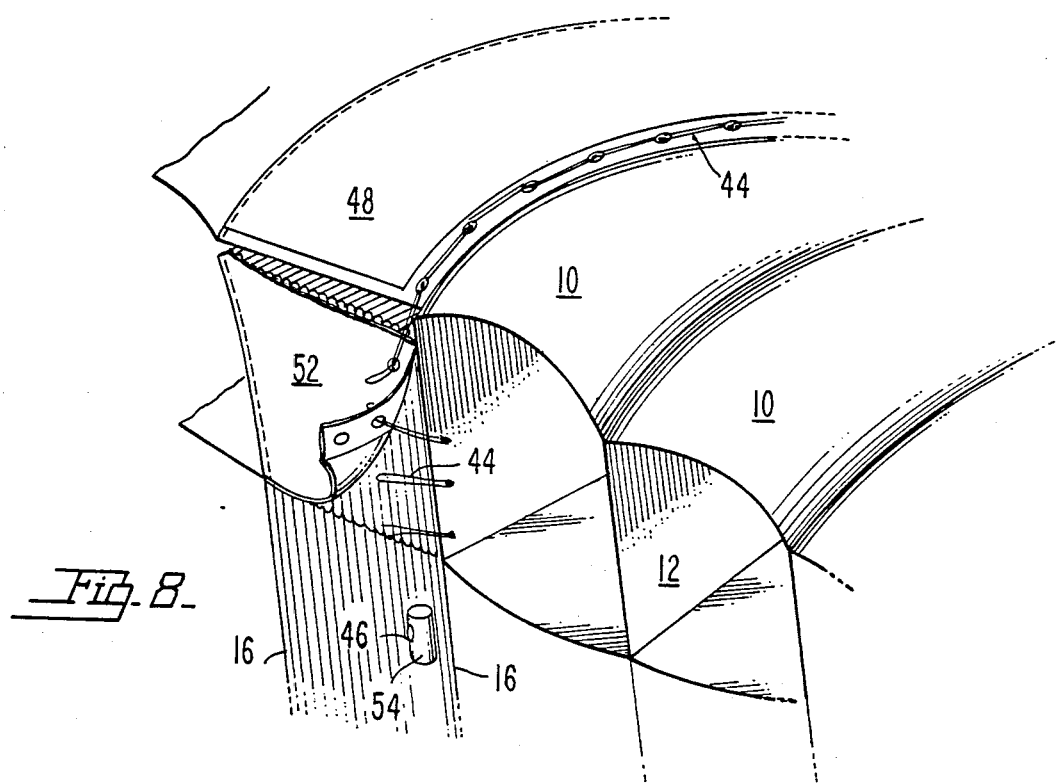
FIG. 8 is an embodiment of the third stage means of the present invention shown in the partially released position.

Third stage reefing retainment means 44 may be included as shown in FIG. 8 to close the front air inlet openings 12 of ram-air inflation cells 10 defined in third stage means 40. Third stage reefing deployment means 46 is operatively connected with respect to the third stage reefing retainment means 44 to facilitate release thereof responsive to full inflation of the second stage means 24. A supplementary third stage reefing retainment means 48 may be included to retain the individual ram-air inflation cells 10 of the third stage means 40 closed simultaneously with the retaining of the front air inlet openings 12 defined within the third stage means 40 closed by the third stage reefing retainment means 44. A third stage lateral lacing means 50 is adapted to extend across the front air inlet openings 12 within third stage means 40 to retain them in a closed position prior to deployment thereof. Also a third stage lateral flap means 52 may be included if a large number of inflation cells 10 are defined within a particular section of the third stage means 40 being simultaneously retained. A third stage pyrotechnic cutting means 54 may be included to facilitate operation of a third stage reefing deployment means 46. This cutting means preferably can cut the third stage lateral lacing means 50 to facilitate deployment of the third stage means 40.

Third stage suspension lines 42 can preferably be of even smaller tensile strength characteristics than the second stage suspension lines 26 since they will operative under much less loaded conditions. Similarly the material defining the ram-air inflation cells 10 within the third stage means 40 can be of a smaller fabric strength material since load conditions incurred thereby will be much less than the load conditions incurred by the second stage 24.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A gliding wing parachute apparatus with staged reefing deployment means comprising:
   (a) a plurality of longitudinally extending ram-air inflation cells being laterally secured with respect to one another, each of said inflation cells defining a front air inlet opening, said front air inlet openings being adapted to allow air to enter said inflation cells for inflation thereof to facilitate load carrying, said gliding wing parachute and said longitudinally extending ram-air inflation cells defining a centerline extending longitudinally along said ram-air inflation cells in the center thereof;
   (b) a plurality of suspension lines extending from said inflation cells downwardly to a common load carrying position therebelow;
   (c) a first stage means comprising a plurality of said ram-air inflation cells with said front air inlet openings defined therein being free to open to allow inflation of said ram-air inflation cells to facilitate initial deployment of the gliding wing parachute;
   (d) a second stage means comprising a plurality of said ram-air inflation cells with said front air inlet openings being retained closed to prevent inflation thereof during deployment of said first stage means said suspension lines extending from the common load carrying position upwardly to said first stage means being of greater tensile strength than those of said suspension lines which extend from the common load carrying position upwardly to said second stage means to withstand the larger forces incurred during initial inflating deployment of said first stage means;
   (e) second stage reefing retainment means adapted to retain said front air inlet openings defined by said ram-air inflation cells of said second stage means closed to prevent air inflation thereof; and
   (f) second stage reefing deployment means operatively attached with respect to said second stage reefing retainment means for selective releasing thereof for fuller deployment of the gliding wing parachute.

2. A gliding wing parachute apparatus with staged reefing deployment means as defined in claim 1 wherein said ram-air inflation cells of said first stage means are made of a stronger material than said ram-air inflation cells of said second stage means to withstand the larger forces incurred during initial inflating deployment of said first stage means.

3. A gliding wing parachute apparatus with staged reefing deployment means as defined in claim 1 wherein said second stage reefing retainment means comprises second stage lateral lacing means selectively retaining said front air inlet openings of said second stage means closed.

4. A gliding wing parachute apparatus with staged reefing deployment means as defined in claim 3 further including second stage lateral flap means to facilitate retainment of said front air inlet openings of said second stage closed.

5. A gliding wing parachute apparatus with staged reefing deployment means as defined in claim 3 further including second stage pyrotechnic cutting means to facilitate release of said second stage lateral lacing means.

6. A gliding wing parachute apparatus with staged reefing deployment means as defined in claim 1 further comprising:
 (a) a third stage means comprising a plurality of said ram-air inflation cells with said front air inlet openings being retained closed to prevent inflation thereof during deployment of said first stage means and said second stage means of the gliding wing parachute;
 (b) a third stage reefing retainment means adapted to retain said front air inlet openings defined by said ram-air inflation cells of said third stage means closed to prevent air inflation thereof; and
 (c) a third stage reefing deployment means operatively attached with respect to said second stage reefing retainment means for selective releasing thereof for fuller deployment of the gliding wing parachute.

7. A gliding wing parachute apparatus with staged reefing deployment means as defined in claim 6 wherein said third stage reefing deployment means is operative to release said third stage reefing retainment means responsive to full inflation of both said first stage means and said second stage means.

8. A gliding wing parachute apparatus with staged reefing deployment means as defined in claim 6 further comprising a supplementary third stage reefing retainment means adapted to retain said ram-air inflation cells of said third stage means in a collapsed position only responsive to said third stage reefing retainment means retaining said front air inlet openings of said third stage means closed preventing inflation thereof.

9. A gliding wing parachute apparatus with staged reefing deployment means as defined in claim 6 wherein said ram-air inflation cells defining said third stage means are symmetrically balanced with respect to said centerline thereof.

10. A gliding wing parachute apparatus with staged reefing deployment means as defined in claim 6 wherein those of said suspension lines which extend from the common load carrying position upwardly to said second stage means are of greater tensile strength than those of said suspension lines which extend from the common load carrying position upwardly to said third stage means to withstand the larger forces incurred during initial inflating deployment of said second stage means.

11. A gliding wing parachute apparatus with staged reefing deployment means as defined in claim 6 wherein said ram-air inflation cells of said second stage means are made of a stronger material than said ram-air inflation cells of said third stage means to withstand the larger forces incurred during initial inflating deployment of said second stage means.

12. A gliding wing parachute apparatus with staged reefing deployment means as defined in claim 6 wherein said third stage reefing retainment means comprises third stage lateral lacing means selectively retaining said front air inlet openings of said third stage means closed.

13. A gliding wing parachute apparatus with staged reefing deployment means as defined in claim 12 further including third stage lateral flap means to facilitate retainment of said front air inlet openings of said third stage closed.

14. A gliding wing parachute apparatus with staged reefing deployment means as defined in claim 12 further including third stage pyrotechnic cutting means to facilitate release of said third stage lateral lacing means.

15. A gliding wing parachute apparatus with staged reefing deployment means comprising:
 (a) a plurality of longitudinally extending ram-air inflation cells being laterally secured with respect to one another, each of said inflation cells defining a front air inlet opening, said front air inlet openings being adapted to allow air to enter said inflation cells for inflation thereof to facilitate load carrying, said gliding wing parachute and said longitudinally extending ram-air inflation cells defining a centerline extending longitudinally along said ram-air inflation cells in the center thereof;
 (b) a plurality of suspension lines extending from said inflation cells downwardly to a common load carrying position therebelow;
 (c) a first stage means comprising a plurality of said ram-air inflation cells with said front air inlet openings defined therein being free to open to allow inflation of said ram-air inflation cells to facilitate initial deployment of the gliding wing parachute, those of said suspension lines extending from the common load position upwardly to said ram-air inflation cells of said first stage means comprising first stage suspension lines;
 (d) a second stage means comprising a plurality of said ram-air inflation cells with said front air inlet openings being retained closed to prevent inflation thereof during deployment of said first stage means, said ram-air inflation cells of said first stage means being made of a stronger material than said ram-air inflation cells of said second stage means to withstand the larger forces incurred during initial inflating deployment of said first stage means, said ram-air inflation cells defining said second stage means being symmetrically balanced with respect to said centerline thereof to facilitate balanced deployment, those of said suspension lines extending from the common load position upwardly to said ram-air inflation cells of said second stage means comprising second stage suspension lines, said first stage suspension lines being of a greater tensile strength than said second stage suspension lines to withstand the larger forces incurred during initial inflating deployment of said first stage means;
 (e) second stage reefing retainment means adapted to retain said front air inlet openings defined by said ram-air inflation cells of said second stage means closed to prevent air inflation thereof, said second stage reefing retainment means comprising second stage lateral lacing means and second stage lateral flap means to selectively facilitate retaining of said front air inlet openings of said second stage means closed;
 (f) second stage reefing deployment means operatively attached with respect to said second stage reefing retainment means for selective releasing thereof for fuller deployment of the gliding wing parachute, said second stage reefing deployment means being operative to release said second stage reefing retainment means responsive to full inflation of said first stage means, said second stage reefing deployment means including second stage pyrotechnic cutting means to facilitate release of said second stage lateral lacing means;

(g) supplementary second stage reefing retainment means adapted to retain said ram-air inflation cells of said second stage means in a collapsed position only responsive to said second stage reefing retainment means retaining said front air inlet openings of said second stage means closed preventing inflation thereof;

(h) a third stage means comprising a plurality of said ram-air inflation cells with said front air inlet openings being retained closed to prevent inflation thereof during deployment of said first stage means and said second stage means of the gliding wing parachute, said ram-air inflation cells of said second stage means being made of a stronger material than said ram-air inflation cells of said third stage means to withstand the larger forces incurred during initial inflating deployment of said second stage means, said ram-air inflation cells defining said third stage means being symmetrically balanced with respect to 89 said centerline thereof, those of said suspension lines extending from the common load position upwardly to said ram-air inflation cells of said third stage means comprising third stage suspension lines, said second stage suspension lines being of greater tensile strength than said third stage suspension lines to withstand the larger forces incurred during initial inflating deployment of said second stage means;

(i) a third stage reefing retainment means adapted to retain said front air inlet openings defined by said ram-air inflation cells of said third stage means closed to prevent air inflation thereof, said third stage reefing retainment means including third stage lateral lacing means and third stage lateral flap means to facilitate selective retaining of said front air inlet opening of said third stage closed;

(j) a third stage reefing deployment means operatively attached with respect to said second stage reefing retainment means for selective releasing thereof for fuller deployment of the gliding wing parachute, said third stage reefing deployment means being operative to release said third stage reefing retainment means responsive to full inflation of both said first stage means and said second stage means, said third stage reefing deployment means including a third stage pyrotechnic cutting means to facilitate release of said third stage lateral lacing means; and (k) supplementary third stage reefing retainment means adapted to retain said ram-air inflation cells of said third stage means in a collapsed position only responsive to said third stage reefing retainment means retaining said front air inlet openings of said third stage means closed preventing inflation thereof.

* * * * *